United States Patent
Costigan et al.

(10) Patent No.: US 9,935,953 B1
(45) Date of Patent: Apr. 3, 2018

(54) SECURE AUTHENTICATING AN USER OF A DEVICE DURING A SESSION WITH A CONNECTED SERVER

(71) Applicant: BehavioMetrics, Lulea (SE)

(72) Inventors: Neil Costigan, Lulea (SE); Ingo Deutschmann, Merseburg (DE); Tony Libell, Lulea (SE); Johanna Skarpman Munter, Lulea (SE); Peder Nordström, Lulea (SE)

(73) Assignee: BEHAVIOMETRICS AB, Lulea (SE)

(*) Notice: Subject to any disclaimer, the term of this patent is extended or adjusted under 35 U.S.C. 154(b) by 189 days.

(21) Appl. No.: 15/182,682

(22) Filed: Jun. 15, 2016

Related U.S. Application Data

(63) Continuation-in-part of application No. 15/073,743, filed on Mar. 18, 2016, which is a continuation-in-part of application No. 14/070,654, filed on Nov. 4, 2013, now Pat. No. 9,301,140.

(60) Provisional application No. 61/722,804, filed on Nov. 6, 2012.

(51) Int. Cl.
*H04L 29/06* (2006.01)
*H04L 9/14* (2006.01)
*H04L 9/30* (2006.01)
*H04L 9/32* (2006.01)
*G06Q 20/38* (2012.01)

(52) U.S. Cl.
CPC ...... *H04L 63/0876* (2013.01); *G06Q 20/3829* (2013.01); *H04L 9/14* (2013.01); *H04L 9/30* (2013.01); *H04L 9/3242* (2013.01); *H04L 9/3247* (2013.01); *H04L 9/3263* (2013.01); *H04L 63/0435* (2013.01); *H04L 63/06* (2013.01); *H04L 63/0823* (2013.01); *H04L 63/166* (2013.01)

(58) Field of Classification Search
CPC . H04L 63/0435; H04L 63/06; H04L 63/0823; H04L 63/0876; H04L 63/166; H04L 9/14; H04L 9/30; H04L 9/3242; H04L 9/3247; H04L 9/3263
See application file for complete search history.

(56) References Cited

U.S. PATENT DOCUMENTS

2011/0126024 A1* 5/2011 Beatson .................. G06F 21/32
713/186

FOREIGN PATENT DOCUMENTS

WO   WO 2005003934 A1 *  1/2005  ............ G06F 21/41

* cited by examiner

*Primary Examiner* — Jeffrey Pwu
*Assistant Examiner* — Thong Truong
(74) *Attorney, Agent, or Firm* — Michael J. Feigin, Esq.; Feigin and Fridman LLC

(57) ABSTRACT

Securely authenticating a user of a device for a service during a session including a transaction between a client and a connected server connected to a Behaviometric-server.

16 Claims, 2 Drawing Sheets

SECURE AUTHENTICATING AN USER OF A DEVICE DURING A SESSION WITH A CONNECTED SERVER

CROSS-REFERENCE TO RELATED APPLICATIONS

The present application is a continuation-in-part of U.S. patent application Ser. No. 14/070,654 filed on Apr. 11, 2013, which claims priority to U.S. provisional 61/722,804 filed Nov. 6, 2012, and claims priority from U.S. patent application Ser. No. 15/073,743 filed on Mar. 15, 2016. The disclosures of the above referenced applications are incorporated herein by reference.

BACKGROUND OF THE INVENTION

1. Field of the Invention

The principles of the present disclosure describe a method, computer program and system for securely authenticating a user of a stationary or mobile device, e.g. a desktop Personal Computer (PC) or a mobile device like a laptop, tablet or smart-phone, during a session with a connected server. The user device may be personally acquired, enterprise-issued, or an enterprise Bring Your Own Device (BYOD). The device may be used in any suitable operating environment e.g. home, office, in the field, etc. The service provided by the server may be a financial transaction, a challenge, a user agreement or releasing patient records.
Definitions:

'Authentication' is defined as the act of confirming the truth of an attribute of a single piece of data claimed true by an entity.

'Federated Identity' is defined as a linked collection of a person's electronic identity and attributes, stored across multiple distinct identity management systems.

'FIDO' is defined as the Fast Identity Online standard as developed by the FIDO Alliance.org.

'UAF' is the Universal Authentication Framework as developed by the FIDO Alliance and specified in the UAF standard 'UAF Device', 'UAF Authenticator' or 'U2F' all define a biometric device implementing the client side specifications defined in the UAF standard.

'Relying Party' defines a service or service provider identified in the UAF specification, which includes handling the registration of UAF devices and implementing the specifications according to the UAF standard.

'FIDO server' is defined as a server or device implementing at least part of the protocol of the server side of the UAF standard.

'Initiate Transaction', 'Authentication Request', 'Transaction Text', 'Text-Hash', 'Challenge', 'Policy', 'FIDO-Identifier' and 'authenticator attestation' are defined as defined in the UAF standard.

"Identity Provider (IdP)' is defined as a device, server, or service, responsible for (a) providing identifiers for users looking to interact with a system, (b) asserting to such a system that an identifier presented by a user is known to the Identity Provider, and, in some cases, (c) providing other information about the user that is known to the Identity Provider.

'MAC (Message Authentication code)' is defined as a symmetric encrypted hash of data.

'Private key' and 'public key' define the respective keys of a public key encryption system like RSA, or ECC and are parts of a Public Key Infrastructure (PKI).

'profile-database (DB)' defines a database containing information about behavior of users.

For a secure-critical (browser- or native-app-based) client running on a device connected with a server, th server running at a 'Relying Party', e.g. a bank, a Fast IDentity Online (FIDO) authentication of the user of the device using a multi-factor authentication process is promoted by third parties, as described in the FIDO Universal Authentication Framework (UAF). Users explicitly approve the use of a UAF device with a specific 'Relying Party'. Unique cryptographic keys are generated and during registration of the device the keys are bound to a 'Relying Party', but only following the user's consent. The client can be pre-installed on the operating system or web browser and may interact with the Universal Second Factor (U2F) protocol or the Universal Authentication Framework (UAF) protocol. Basically if a FIDO UAF Authenticator has a transaction confirmation display capability, FIDO UAF architecture makes sure that the system supports 'What You See is What You Sign' mode (WYSIWYS). To avoid misunderstandings, the following disclosure primarily uses terminology of FIDO UAF architecture (Architectural Overview; FIDO Alliance Implementation Draft 15 Dec. 2015).

2. Description of the Related Art

Typically a user using a device is authenticated for access to a server by his unique User Name (UN) and his secret Password (PW), but this level of security is insufficient for secure transactions in the context of this disclosure.

The present invention relates to FIDO UAF complements, advanced Federated Identity Management (FIM) frameworks, and web authorization protocols. A FIM 'Relying Party' can leverage an initial authentication event at an Identity Provider (IdP), but often does not define specific mechanisms for direct user authentication at the IdP.

The aim of the FIDO standard is that specifications thereof will support a full range of authentication technologies, including biometrics such as fingerprint, iris scanners, and voice and facial recognition, as well as existing solutions and communications standards, such as Trusted Platform Modules (TPM), Universal Serial Bus (USB) security tokens, embedded Secure Elements (eSE), smart cards, and near field communication (NFC). In accordance with FIDO, the user's device registers the user to a server by registering a public key. To authenticate the user, the device signs a challenge provided by the server using the private key that it holds. The private keys (e.g. Rivest, Shamir and Adleman (RSA) cryptosystem, Elliptic Curve Cryptography (ECC)) on the device are unlocked by a gesture of the user, such as providing a biometric identifier or pressing a button. By contrast, in accordance with the UAF protocol, user verification is performed locally. The UAF protocol does not convey biometric data to a 'Relying Party', nor does it require the storage of such data at the 'Relying Party'.

U.S. Pat. No. 4,720,860 discloses a method and apparatus for positively identifying a user using a Two-factor authentication using a unique personal credit-card comprising a microprocessor. This solution as such is not adaptable for using a lot of different services via one device.

US Patent Application Publication 2011/0126024 discloses at least two behavioral data of a mobile user device gathered during a current session and used in authentication of the user to get access to the device and/or to a local or a remote application or service. The mobile device contains an Encrypted Data Storage (EDS) unit and a stored Encrypted Biometric Template (EBT) of the device's owner. However, this disclosure doesn't teach gathering of the behavioral data entered during a current session by a background process.

U.S. patent application Ser. No. 14/070,654 discloses an improved method for authenticating a user of a mobile device using behavioral information through behavior monitoring and using behaviometric information associated with the user-profile stored in a Behaviometric-server to determine security clearance during future uses of the device. In other words, during a current session of use of the mobile device, behavioral data is collected by a background process and compared to previously collected behavioral data included in the user's profile. Thus, the method employs two states are used, a system setup state and an authentication state.

Accordingly, it is an object of the present invention to provide an improved FIDO-like system for online strong authentication of a user using a device and seeking access to an online service and/or website, whether on a public network such as the Internet or within enterprises.

SUMMARY OF THE INVENTION

The present disclosure describes a method, a computer program algorithm and product including this for executing the method, and a computer-system executing the algorithm. The present invention overcomes the deficiencies and limitations discussed in the Background section at least in part by providing innovative systems, programs and methods for secure authenticating a user of a device during a session with a connected server and to reduce the problems associated with creating and remembering many online credentials.

In accordance with an embodiment of the disclosed technology, there is provided a computer-implemented method for secure authentication of a user (6) of a device (7) for a service during a session including a transaction between a Fast Identity Online (FIDO) client (8) running on the device (7) and a connected FIDO-server (9) of a 'Relying Party' (12), the FIDO-server being associated with a web-server (11) and with a Behaviometric-server (13), the device (7) using a user-agent (10) including a FIDO-interface for communicating encrypted FIDO-Universal Authentication Framework (UAF) messages having a unique and secret FIDO identifier between said user agent and the web-server (11) using a TLS protocol, the FIDO-interface enabling the use of authenticator-based cryptographic services for FIDO-supported operations supported by a registered FIDO-authenticator (14) including a private key and related public key of the user as a key pair located at the device (7), the session including at least two stages including at least one preparation stage (21, 25) and at least one subsequent authentication stage (22, 26), the method comprising: in the preparation stage (21, 25):
a) initiating a TLS-connection between the user agent (10) of the user device (7) and the web-server (11);
b) generating, at the web-server (11), a unique session-ID for the session;
c) using at least one background process, collecting and storing behavioral data from at least one user input component of the device (7) on a non-transitory storage medium housed within the device (7), wherein behavioral data collected during the session is associated with the session-ID; and d) transmitting an 'Initiate transaction' message, from the FIDO-client (8) to the Behaviometric server (13) via the TLS-connection and the web-server (11), the 'Initiate transaction' message including the FIDO-identifier and at least a portion of the stored behavioral data;
and
in the authentication stage (22, 26):
e) comparing, at the Behaviometric-server (13), the FIDO-identifier and the behavioral data received in the 'linitate transaction' to profile data related to the received FIDO-identifier collected during prior usage of the service of 'Relying Party' (12) by the user (6);
f) determining, at the Behaviometric-server (13), whether the behavioral data collected during the preparation stage and transmitted in the 'Initiate transaction' message matches the profile data, whereby the result of the determining is an authentication or a rejection of privileged access sought by the user (6);
when the results is the authentication:
g) transmitting the 'Initiate Transaction' message to the FIDO-server (9);
h) generating, at the FIDO-server (9), an 'Authentication Request' including the FIDO-identifier as well as a 'Transaction Text' and a related 'Text-Hash';
i) transmitting the 'Authentication Request' from the FIDO-server (9) to the FIDO client (8);
j) using the FIDO-client (8), requesting the user to carry out a user-action for signing the 'Text-Hash' with a unique private key forming part of an asymmetric key-pair associated with the user (6) and located in the device (7);
k) at the FIDO-client (8), generating an 'Authentication Response' including the 'Text-Hash' signed with the private key;
l) transmitting the 'Authentication Response' from the FIDO-client (8) to the FIDO-server (9); and
m) if the signed 'Text-Hash' is positively validated by the FIDO-server (9) using a public key forming part of the asymmetric key-pair associated with the user, executing the transaction requested by the user (6).

In some embodiments, the FIDO-client (8) comprises a FIDO-UAF client and the FIDO-server (9) comprises a FIDO-UAF-Server.

In some embodiments, the Behaviometric-server (13) includes a decryption-server, and wherein at least one of (d) and (k) comprises the user-agent transmitting encrypted data to the decryption-server.

In some embodiments, the method further includes sending a 'Transaction Text', from said Behaviometric-server (13) to the FIDO-server (9) for generation of the 'Authentication Request', the 'Transaction Text' being protected by at least one of encryption associated with a symmetric-key associated with the Behaviometric server (13) and a MAC or signature of the Behaviometric server (13); and upon receipt of the 'Authentication Request', at the FIDO-client (8), decrypting the 'Authentication Request' using the symmetric-key associated with the Behaviometric server (13) transmitted with the 'Authentication Request' and validating the MAC or the signature of the Behaviometric-server (13) using a public key or a certificate of the Behaviometric-server (13) included in the 'Authentication Request'.

In some embodiments, the method further includes generating the public key associated with the MAC using a PKI, and wherein the public key is transmitted to the device (7) via at least one of a Diffie-Hellman key exchange, an Elliptic curve Diffie-Hellman exchanged, or an ephemeral Elliptic curve Diffie-Hellman exchange.

In some embodiments, the method further includes:
sending to the user device (7) and presenting to the user (6) an input form containing a text; and
receiving from the user additional behavioral data, collected while the user (6) reenters the text.

In some embodiments, the user-action comprises the user providing a PIN related to the user for the service (7).

In some embodiments, at step (d), the transmitting includes transmitting, together with the 'Initiate Transaction' message, transmitting at least one of additional information relating to the user and additional transactional data from the user agent (10) to the Behaviometric-server (13).

In some embodiments, the Behaviometric-server (13) is functionally associated with a profile database (DB) containing behavioral data.

In some embodiments, (d) comprises the FIDO-client (8) transmitting, together with the 'Initiate Transaction', transactional information.

In some embodiments, the Behaviometric-server (13) is located in at least one of the FIDO-server (9) and a protected area of the 'Relying Party' (12).

In some embodiments, the Behaviometric-server (13) is located remotely to the FIDO-server (9) and to a protected area of the 'Relying Party' (12).

In some embodiments, the behavioral data comprises at least one electronic input observation derived from interaction of the user (6) with the at least one user input component; the at least one electronic input observation is selected from the group consisting of: a keystroke pattern, a keystroke style, keystroke dwell, keystroke flight time, user touch values, user pressure values, and use of at least one particular application; and the behavioral data entered during the session is collected by the background process.

In accordance with another embodiment of the disclosed technology, there is provided a method for secure authentication of a user (6) of a device for a service during a session including a transaction between a client running on the device (7) and a connected server, the server being associated with a web-server (11) of a 'Relying Party' and with a Behaviometric server (13), the device using a user-agent (10) including an interface for encrypted communication between the user-agent (10) of the client and at least one of the web-server (11) the Behaviometric-server (13) using a unique and secret identifier,
the session including at least two stages including at least one preparation stage (21, 25) and at least one subsequent authentication stage (22, 26), the method comprising:
in a primary preparation stage (21):
a) initiating a connection between the user-agent (10) and the web-server (11) of the 'Relying Party';
b) generating, at the web-server, a session-ID for the session;
c) using at least one background process, collecting and storing behavioral data from at least one user input component of the device (7) on a non-transitory storage medium housed within the device (7), wherein the behavioral data collected during the session is associated with the session-ID; and
d) transmitting at least the identifier and at least a portion of the stored behavioral data to the Behaviometric server (13) via the connection and the web-server (11); and
in the authentication stage (22):
e) comparing, at the Behaviometric-server (13), the received identifier and the received behavioral data to profile data related to the received identifier collected during prior usage of the service of 'Relying Party' (12) by the user (6);

f) determining, at the Behaviometric-server (13), whether the behavioral data collected during the preparation stage matches the profile data, whereby the result of the determining is an authentication or a rejection of privileged access sought by the user (6);
g) when the result is the authentication, executing the transaction requested by the user (6);
g) when the result is the rejection:
1) sending to the user device (7) and presenting to the user (6) an input form including at least one part of stored data entered by the user at at least one previous session resulting in authentication;
in a secondary preparation stage:
2) asking the user (6) to reenter the at least one part of stored data;
3) collecting and storing behavioral data from at least one user input component of the device (7) on the non-transitory storage medium housed within the device (7), the collecting being carried out by a background process; and
4) transmitting the identifier and at least a portion of the stored behavioral data from the client to the Behaviometric-server (13) via the web-server (11) and the connection; and
in a secondary authentication stage (26):
5) the Behaviometric-server (13) matches the identifier and the behavioral data received during the secondary preparation stage to the profile data related to the received identifier collected during prior usage of the service of the 'Relying Party' (12) by the user (6);
6) determining, by the Behaviometric-server (13), whether the received behavioral data entered during the secondary preparation stage matches collected behavioral data whereby the result of the determining is an authentication or a rejection of privileged access sought by the user (6);
7) if the result is the authentication, executing the transaction requested by the user (6) of the service.

In some embodiments, the method further includes:
in the primary preparation stage (21):
capturing device information relating to the user device (7);
transmitting the captured device information to the Behaviometric-server (13);
storing the captured device information, associated with the behavioral data in a memory associated with the Behaviometric-server (13); and
the method further including, following rejection at the primary authentication stage (22). selecting a part of stored data dependent on the device information.

In some embodiments, following the rejection in the secondary authentication stage, the transaction requested by the user (6) of the service is prohibited.

The novel features of the present invention are set forth in the appended claims. The invention itself, however, both its construction and its mode of operation, together with additional advantages and objects thereof, will be best understood from the following detailed description when read with reference to the accompanying drawings.

DETAILED DESCRIPTION

Figure 1:
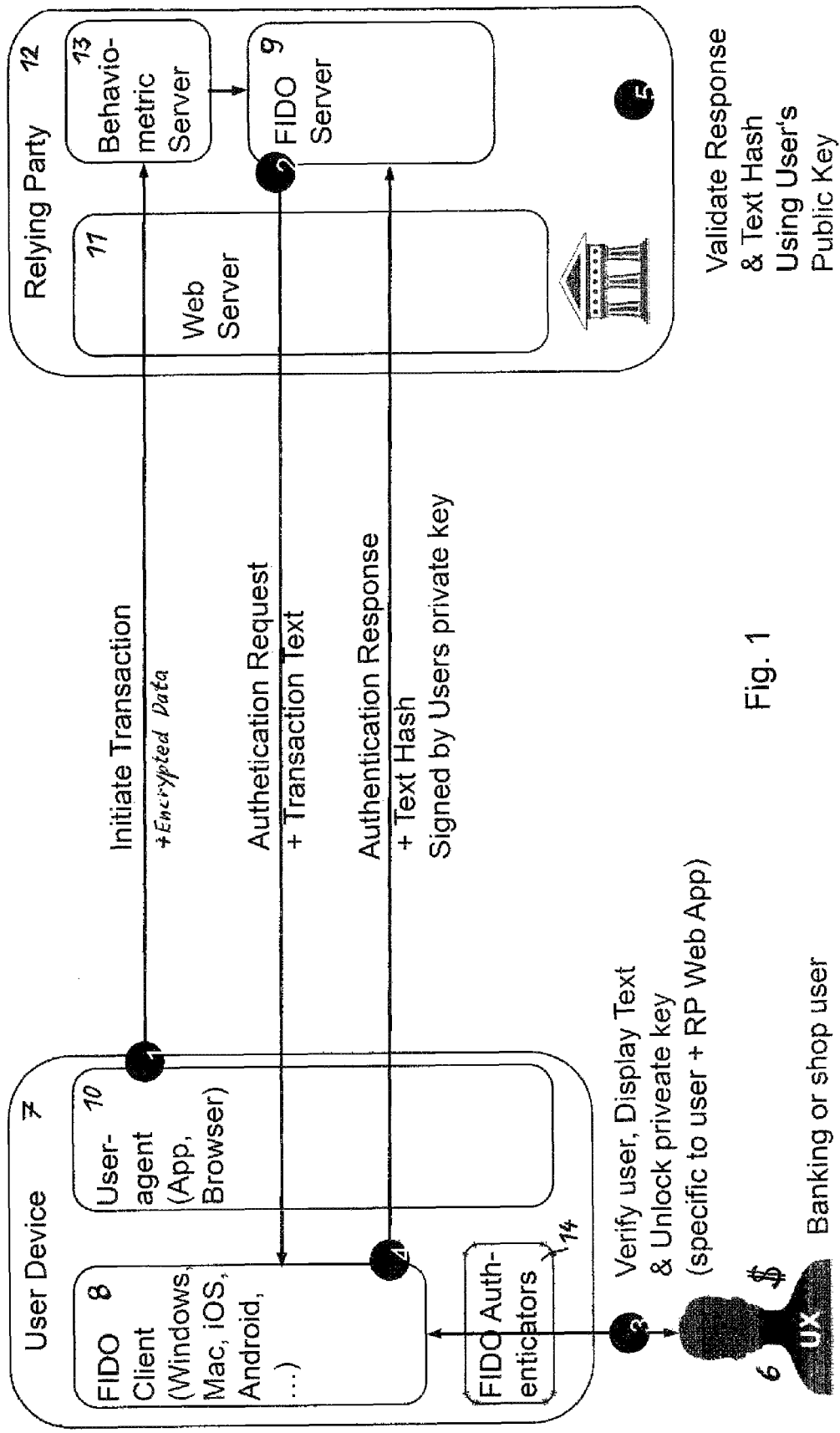
FIG. 1 shows a schematic illustration of a computer system and a method useful for securely authenticating a user in a FIDO-like manner.

The technology described herein includes systems, program-products (e.g. a stick), and methods for verifying that a user device, which seeks access to a software service, is being operated by a human being, and for authenticating a user of the user device during a session with a connected server in a FIDO-'Confirmation Message Flow' like manner.

The systems, program-products and methods are typically used for verification and authentication of the user in software services, such as social platforms, databases, banking accounts, and/or controlling interfaces of computers and machines, but may also be used with respect to general usage of computers.

For each interaction or specific set of interactions of the user with one or more input components of the user device, such as a mouse, keyboard, touch-pad, sensor-pen and the like, behavior input data collected from the input component(s) is stored. The stored data may optionally include additional sensor data, for example gathered from one or more sensors of the user device, such as an accelerometer, a gyroscope, a magnetometer, pressure-sensors and other sensors. At a late stage, the stored data may used by authentication methods as described herein.

To authenticate the user during a client session running on the device and connected to a server for a secure-related transaction in a FIDO-like manner, both the connected server and the client or device running the client have to fulfill some requirements specified in the FIDO UAF protocols.

The FIDO UAF Authenticator Abstraction Layer provides a uniform API to FIDO-clients enabling the use of authenticator-based cryptographic services for FIDO-supported operations. A FIDO UAF Client implements the client side of the FIDO UAF protocols, and is responsible for:

Interacting with specific FIDO UAF Authenticators using the FIDO UAF Authenticator Abstraction layer via the FIDO UAF Authenticator API; and Interacting with a user agent on the device (e.g. a mobile app, browser) using user agent-specific interfaces to communicate with the FIDO UAF Server. For example, a FIDO-specific browser plug-in would use existing browser plug-in interfaces or a mobile app may use a FIDO-specific SDK.

The FIDO UAF server is conceived as being deployable as an on-premises server by 'Relying Parties' or might be outsourced to a FIDO-enabled third-party service provider. A FIDO UAF server implements the server side of the FIDO UAF protocols and is responsible for:

Interacting with the 'Relying Party' web-server to communicate FIDO UAF protocol messages to a FIDO UAF Client via a device user agent;

Validating FIDO UAF authenticator attestations against configured authenticator metadata to ensure that only trusted authenticators are registered for use;

Managing the association of registered FIDO UAF Authenticators to user accounts at the 'Relying Party'; and Evaluating user authentication and transaction confirmation responses to determine their validity.

The FIDO UAF registration protocol enables 'Relying Parties' to:

Discover the FIDO UAF Authenticators available on a user's system or device. Discovery will convey FIDO UAF Authenticator attributes to the 'Relying Party' thus enabling policy decisions and enforcement to take place;

Verify attestation assertions made by the FIDO UAF Authenticators to ensure the authenticator is authentic and trusted. Verification occurs using the attestation public key certificates distributed via authenticator metadata; and Register the authenticator and associate it with the user's account at the 'Relying Party'. Once an authenticator attestation has been validated, the 'Relying Party' can provide a unique secure identifier that is specific to the 'Relying Party' and the FIDO UAF Authenticator. This identifier can be used in future interactions between the pair {'Relying Party', Authenticator} and is not known to any other devices.

It is expected that users will acquire FIDO UAF Authenticators in various ways: they purchase a new system that comes with embedded FIDO UAF Authenticator capability, they purchase a device with an embedded FIDO UAF Authenticator, or they are given a FIDO Authenticator by their employer or some other institution such as their bank. After receiving a FIDO UAF Authenticator, the user must go through an authenticator-specific enrollment process, which is outside the scope of the FIDO UAF protocols. For example, in the case of a fingerprint sensing authenticator, the user must register their fingerprint(s) with the authenticator. Once enrollment is complete, the FIDO UAF Authenticator is ready for registration with FIDO UAF enabled online services and websites. Some authenticators may sample biometric data such as a face image, fingerprint, or voice print. Others will require a PIN or local authenticator-specific passphrase entry. Still others may simply be a hardware bearer authenticator. The UAF protocol generates unique asymmetric cryptographic key pairs on a per-device, per-user account, and per-'Relying Party' basis.

Reference is now made to FIG. 1, which is a schematic illustration of a computer system for secure authentication of a user and a method for providing a FIDO-UAF confirmation for a transaction in a FIDO-UAF-like manner.

As seen in FIG. 1, a user 6 is uses a mobile device 7, such as a smart-phone, which device includes a FIDO-client 8 functioning as a FIDO-UAF-client, and is connected to a FIDO-server 9 functioning as a FIDO-UAF-server. The FIDO-client 8 is running on device 7 using a user-agent 10 (e.g. a mobile app, browser) with a specific FIDO-interface (e.g. a FIDO-specific browser plugin using a browser plugin interface or a mobile app using a FIDO-specific SDK). The user-agent 10 may communicate encrypted FIDO UAF messages, for example using a TLS-protocol, to a web-server 11 associated with the FIDO-server 9 and forming part of a 'Relying Party' 12, which may for example be a bank, A behaviometric-server 13, also associated with Relying party 12 and with FIDO server 9, uses a unique and secret FIDO-identifier (e.g. a hash-value created from Relying Party, date and time) and also communicates with user agent 10. User-agent 10 sends encrypted data to a Decryption-server forming part of behaviometric-server 13. The specific FIDO-interface enabling the use of authenticator-based cryptographic services for FIDO-supported operations, is supported by a registered FIDO-authenticator 14 containing a private key for the user and a related public key as a key pair located at device 7. An authentication session using the system described herein comprises at least two stages, including an earlier preparation stage and a later authentication stage.

In some embodiments, at least two of the following actions are carried out during the preparation stage:

a) A unique session-ID is generated by web-server 11 when user 6 establishes a TLS-connection of user-agent 10 with web-server 11 of 'Relying Party' 12.

b) Behavioral data relating to user 6 is stored on a non-transitory storage medium housed within device 7, which data is collected from at least one input component of device 7 by a background process;

c) An 'Initiate transaction' message is transmitted from FIDO client 8 to web server 11 via the TLS-connection, the 'Initiate transaction' message including the FIDO-identifier and at least a portion of the stored behavioral data. The web-server 11 conveys the 'Initiate transaction' message, the FIDO-identifier, and at least a portion of the stored behavioral data to the behaviometric-server 13.

In some embodiments of the disclosed technology, at least three of the actions listed below are carried out during the authentication stage.

a) Behaviometric-server 13 compares the FIDO-identifier and the behavioral data received with the 'Initiate transaction message' to profile data related to the received FIDO-identifier which was collected during prior use of the service provided by 'Relying Party' 12 by user 6;

b) Behaviometric-server 13 determines whether behavioral data entered during the preparation stage session of device 7 matches the behavioral data collected during the current session, whereby the result is an authentication (if a match is found) or a rejection (if no match is found) of privileged access sought by user 6.

c) If the result of action B is an authentication, =the 'Initiate Transaction' message 1 is transmitted from user-agent 10 to FIDO-server 9.

d) If the result of action B is an authentication, FIDO-server 9 generates an 'Authentication Request' 2 using the FIDO-identifier. The 'Authentication Request' may be accompanied by a 'Transaction Text' and a related 'Text-Hash', which respectively define a 'Challenge' and a 'Policy' for FIDO-client 8.

e) If the result of action B is an authentication, FIDO server 9 transmits 'Authentication Request' 2 to FIDO-client 8;

f) FIDO-client 8 requests a user-action 3, to be carried out by user 6, for responding to the 'Challenge' by providing an appropriate 'Text-Hash' with a unique private key forming part of an asymmetric key-pair of user 6 located at or associated with the device 7. Further, the requested user-action 3 may also include a request for features like computational face recognition and/or fingerprint recognition and/or video-sequence-analysis captured by a camera of the user device 7 to be used as the signature, for example by selecting a twinkle in eyes of user's 6 as the signature.

g) based on 'Authentication Request' 2 and on input received from the user in response to user action 3, FIDO-client 8 generates an 'Authentication Response' 4 and a suitable 'Text-Hash' for responding to the 'Challenge', both signed with the user's private key; h) FIDO client 8 transmits the generated 'Authentication Response' 4 and associated 'Text-Hash' signed with said private key to FIDO-server 9 so as to execute the transaction requested by user 6 of the service, only in the case that the signed 'Text-Hash' responding to the 'Challenge' is positively validated 5 by FIDO-server 9 using a public key corresponding to the private key used to create the text has which public key is located at the 'Relying Party' 12.

Behaviometric-server 13 sends a 'Transaction Text' signed and/or encrypted by MAC and/or a Behaviometric-server-Certificate to FIDO-server 9 for generation of the 'Authentification Request' 2. FIDO-client 8 can decrypt the message and check the MAC and/or signature of the Behaviometric-server 13 by using a public key included with the message (in case of said MAC) and/or the signature or certificate of the Behaviometric-server 13=. For validating the MAC, the device may use a symmetric key generated by a PKI and/or provided to device 7 via ephemeral Elliptic curve Diffie-Hellman key exchange.

Web-server 11 also sends an input form to user device 7, for presenting the form to user 6. The input form contains text, such as a captcha, which user 6 has to reenter, in order to capture additional behavioral data for user 6. User-action 3 may also request a PIN related to user 6, which pin may be used to authenticate a transaction with the bank, which may, for example, be a payment transaction. Behavioral data may be captured from user 6 while he uses a banking application or banking website.

The behavior of user 6 is captured while entering credentials such as username/passwords; other user information such as birthday, birthplace; transactional data such as a beneficiary, account numbers or other banking related data; or even credit card data in a shop environment. Every interaction of user 6 with user device 7 can be used to capture data relating to the user's behavior, at the same time as carrying out the transaction. The behavioral data may include touch gestures, keyboard actions (dwell, flight time), and/or movements of device 7 by capturing data from a gyrostatic or accelerometer sensor as well as GPS-coordinates. The behavioral data may further include electronic input observations such as keystroke patterns and style, usage of particular applications, and speech recognition.

FIDO-client 8 transmits the 'Initiate Transaction' message, including the FIDO identifier, transactional information, and at least a portion of the collected behavioral data, via the TLS-connection to web-server 11, which conveys the received 'Initiate Transaction' message 1, the FIDO-identifier, the transactional information and at least a portion of the stored behavioral data to the Behaviometric-server 13.

Behaviometric-server 13 shown in FIG. 1 is located inside a protected area of the 'Relying Party' 12. However, it will be appreciated that Behaviometric-server 13 may also be located outside of the protected area of 'Relying Party' 12, and may be located in any cloud based location on the Internet. Behaviometric-server 13 is connected to a profile-DB (not shown) containing behavioral data.

A unique FIDO-identifier-profile is created and stored in the profile-DB by Behaviometric-server 13, and collected behavioral data were added to the profile, during a Registration-session of a new FIDO-identifier in which the user wishes to access a sought service. The Registration session includes creation of the user's key-pair including the user's attestation private key at device 7, as well as an attestation established using the user's attestation public key, which attestation is transmitted by FIDO-client 8 to FIDO-server 9 and stored in a 'Cryptographic authentication key reference DB' (not shown) at the 'Relying Party' 12.

FIDO-server 9 creates a 'Registration Request' and a 'Policy' for performing connection-oriented communication between FIDO-client 8 and FIDO-server 9 during the span of time required for the transaction, which communication provides privileged access sought by user 6 for the transaction and received by FIDO-client 8, whereby the FIDO identifier for FIDO-client 8 is related to the collected behavioral data. Additionally, as mentioned above, a unique user-profile was created and stored in the profile-DB by Behaviometric-server 13. It will be appreciated that collected behavioral data were added to the profile-DB during the Registration-session if new personal data of the user 6 became available.

Figure 2:
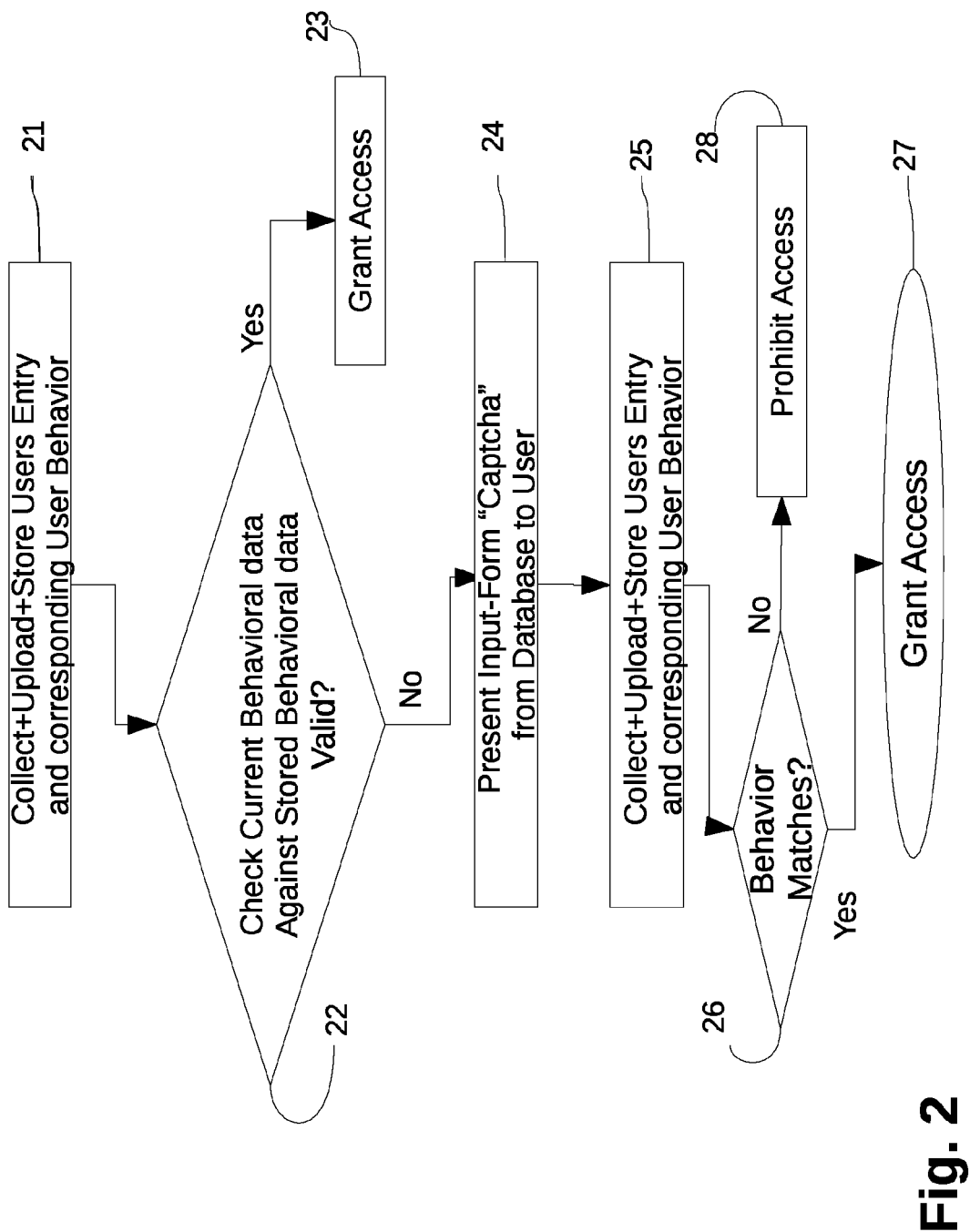
FIG. 2 shows a flow chart of steps taken in a method of an embodiment of the disclosed technology.

Reference is now made to FIG. 2, which shows a flow-chart of a method for securely authenticating a user of a device for a service during a session including a transaction between a client and a connected server. The client runs on the device using a user-agent, such as a mobile app or browser using a browser plugin interfaces or a mobile app. An encrypted communication using a unique and secret identifier is carreid out between the user-agent of the client and a web-server of the server of the 'Relying Party' and/or a Behaviometric-server. The identifier may be a hash-value created from the 'Relying Party', a date and time between the client and the server, or the like. The session may include one (primary only) or two (also secondary) times, relating to two stages including an earlier preparation stage and a later authentication stage each time.

In the primary preparation stage of a session, illustrated at step 21:

a) the session starts with a unique session-ID generated and provided by the web-server when the user establishes a connection of the user-agent to the web-server of the 'Relying Party';

b) behavioral data and possibly other user information and/or transactional data from at least one user input component of the user device is stored on a non-transitory storage medium housed within the device, wherein the behavioral data collected during the current session having the unique session-ID is collected by a background process;

c) the client transmits the identifier and at least a portion of the stored behavioral data, and in some embodiments additional user information and/or transactional data, via the connection, to the web server, which conveys the received data to the Behaviometric-server;

In some embodiments, additional information relating to the user device is captured, and is transmitted to the Behaviometric-server and stored therein in association with the behavioral data and additional user information and/or transactional data transmitted to the Behaviometric-server.

In the primary authentication stage of the session, illustrated at step 22:

d) said the Behaviometric-server matches the received identifier and behavioral data to profile data related to the received identifier collected during prior usage of the service of the 'Relying Party' by the user;

e) the Behaviometric-server determines whether the received behavioral data and additional data received and/or entered during the primary preparation stage of the session of the device matches the received behavioral data and additional data whereby the result is an authentication or a rejection of privileged access sought by the user;

f) if the determination at step (e) results in authentication, at step 23 primary access is granted to the user device to execute the transaction requested by the user of the service;

g) if the determination at step (e) results in rejection:

g1) at step 24, sending to the user device and presenting to the user an input form, such as a captcha, relating to at least one part of stored data or other user information and/or transactional data entered by the user at a previous session which resulted in authentication of the user. The portion of data is selected to be based on the profile data relating to the user, and to be similar to current device information received from the user;

g2) asking the user to reenter the part of stored data.

Following the captcha challenge, in a secondary preparation stage 25:

g3) behavioral data from at least one user input component of the device is stored on a non-transitory storage medium housed within the device, wherein the behavioral data collected during the current session with the current session-ID are collected by a background process;

g4) the client transmits the identifier and at least a portion of the stored behavioral data, in some embodiments together with other user information and/or transactional data, via the connection to the web-server, which conveys the received identifier and data to the Behaviometric-server.

Subsequently, in a secondary authentication stage 26:

g5) the Behaviometric-server matches the received identifier and the received behavioral data to profile data related to the received identifier collected during prior usage of the service of the 'Relying Party' by the user;

g6) the Behaviometric-server determines whether the received behavioral data and additional data entered during the secondary preparation stage (step 25) of the session of matches collected behavioral data and additional data, whereby the result of the determination is an authentication or a rejection of privileged access sought by the user;

g7) if the determination in step g6 results in authentication, secondary access is granted to execute the transaction requested by the user of the service at step 27;

g8) if the determination at step g6 results in rejection, the transaction requested by the user of the service is prohibited at step 28.

Although the present invention was shown and described with references to the preferred embodiments, these are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

The invention claimed is:

1. A computer-implemented method for secure authentication of a user (6) of a device (7) for a service during a session including a transaction between a Fast Identity Online (FIDO) client (8) running on said device (7) and a connected FIDO-server (9) of a 'Relying Party' (12), the FIDO-server being associated with a web-server (11) and with a Behaviometric-server (13), said device (7) using a user-agent (10) including a FIDO-interface for communicating encrypted FIDO-Universal Authentication Framework (UAF) messages having a unique and secret FIDO identifier between said user agent and said web-server (11) using a TLS protocol, said FIDO-interface enabling the use of authenticator-based cryptographic services for FIDO-supported operations supported by a registered FIDO-authenticator (14) including a private key and related public key of said user as a key pair located at said device (7), said session including at least two stages including at least one preparation stage (21, 25) and at least one subsequent authentication stage (22, 26), the method comprising: in said preparation stage (21, 25):

a) initiating a TLS-connection between said user agent (10) of said user device (7) and said web-server (11);

b) generating, at said web-server (11), a unique session-ID for said session;

c) using at least one background process, collecting and storing behavioral data from at least one user input component of said device (7) on a non-transitory storage medium housed within said device (7), wherein behavioral data collected during said session is associated with said session-ID; and d) transmitting an 'Initiate transaction' message, from said FIDO-client (8) to said Behaviometric server (13) via said TLS-connection and said web-server (11), said 'Initiate transaction' message including said FIDO-identifier and at least a portion of said stored behavioral data;
and
in said authentication stage (22, 26):
e) comparing, at said Behaviometric-server (13), said FIDO-identifier and said behavioral data received in said 'Initiate transaction' to profile data related to said received FIDO-identifier collected during prior usage of said service of 'Relying Party' 635 (12) by said user (6);
f) determining, at said Behaviometric-server (13), whether said behavioral data collected during said preparation stage and transmitted in said 'Initiate transaction' message matches said profile data, whereby the result of said determining is an authentication or a rejection of privileged access sought by said user (6);
when said results is said authentication:
g) transmitting said 'Initiate Transaction' message to said FIDO-server (9);
h) generating, at said FIDO-server (9), an 'Authentication Request' including said FIDO-identifier as well as a 'Transaction Text' and a related 'Text-Hash';
i) transmitting said 'Authentication Request' from said FIDO-server (9) to said FIDO client (8);
j) using said FIDO-client (8), requesting said user to carry out a user-action for signing said 'Text-Hash' with a unique private key forming part of an asymmetric key-pair associated with said user (6) and located in said device (7);
k) at said FIDO-client (8), generating an 'Authentication Response' including said 'Text-Hash' signed with said private key;
l) transmitting said 'Authentication Response' from said FIDO-client (8) to said FIDO-server (9); and
m) if said signed 'Text-Hash' is positively validated by said FIDO-server (9) using a public key forming part of said asymmetric key-pair associated with said user, executing said transaction requested by said user (6).

2. The method of claim 1, wherein said FIDO-client (8) comprises a FIDO-UAF client and said FIDO-server (9) comprises a FIDO-UAF-Server.

3. The method of claim 1, wherein said Behaviometric-server (13) includes a decryption-server, and wherein at least one of (d) and (k) comprises said user-agent transmitting encrypted data to said decryption-server.

4. The method of claim 1, further comprising:
sending a 'Transaction Text', from said Behaviometric-server (13) to said FIDO-server (9) for generation of said 'Authentication Request', said 'Transaction Text' being protected by at least one of encryption associated with a symmetric-key associated with said Behaviometric server (13) and a MAC or signature of said Behaviometric server (13); and
upon receipt of said 'Authentication Request', at said FIDO-client (8), decrypting said 'Authentication Request' using said symmetric-key associated with said Behaviometric server (13) transmitted with said 'Authentication Request' and validating said MAC or said signature of said Behaviometric-server (13) using a public key or a certificate of said Behaviometric-server (13) included in said 'Authentication Request'.

5. The method of claim 4, further comprising generating said public key associated with said MAC using a PKI, and wherein said public key is transmitted to said device (7) via at least one of a Diffie-Hellman key exchange, an Elliptic curve Diffie-Hellman exchanged, or an ephemeral Elliptic curve Diffie-Hellman exchange.

6. The method of claim 1, further comprising:
sending to said user device (7) and presenting to said user (6) an input form containing a text; and
receiving from the user additional behavioral data, collected while said user (6) reenters said text.

7. The method of claim 1, wherein user-action comprises the user providing a PIN related to said user for said service (7).

8. The method of claim 1, wherein at step (d), said transmitting includes transmitting, together with said 'Initiate Transaction' message, transmitting at least one of additional information relating to said user and additional transactional data from said user agent (10) to said Behaviometric-server (13).

9. The method of claim 1, wherein said Behaviometric-server (13) is functionally associated with a profile database (DB) containing behavioral data.

10. The method of claim 1, wherein (d) comprises said FIDO-client (8) transmitting, together with said 'Initiate Transaction', transactional information.

11. The method of claim 1, wherein said Behaviometric-server (13) is located in at least one of said FIDO-server (9) and a protected area of said 'Relying Party' (12).

12. The method of claim 1, wherein said Behaviometric-server (13) is located remotely to said FIDO-server (9) and to a protected area of said 'Relying Party' (12).

13. The method of claim 1, wherein:
said behavioral data comprises at least one electronic input observation derived from interaction of said user (6) with said at least one user input component;
said at least one electronic input observation is selected from the group consisting of: a keystroke pattern, a keystroke style, keystroke dwell, keystroke flight time, user touch values, user pressure values, and use of at least one particular application; and
said behavioral data entered during said session is collected by said background process.

14. Method for secure authentication of a user (6) of a device for a service during a session including a transaction between a client running on said device (7) and a connected server, the server being associated with a web-server (11) of a 'Relying Party' and with a Behaviometric server (13), said device using a user-agent (10) including an interface for encrypted communication between said user-agent (10) of said client and at least one of said web-server (11) said Behaviometric-server (13) using a unique and secret identifier,
said session including at least two stages including at least one preparation stage (21, 25) and at least one subsequent authentication stage (22, 26), the method comprising:
in a primary preparation stage (21):
a) initiating a connection between said user-agent (10) and said web-server (11) of said 'Relying Party';
b) generating, at said web-server, a session-ID for said session;
c) using at least one background process, collecting and storing behavioral data from at least one user input component of said device (7) on a non-transitory storage medium housed within said device (7), wherein said behavioral data collected during said session is associated with said session-ID; and d) transmitting at least said identifier and at least a portion of said stored behavioral data to said Behaviometric server (13) via said connection and said web-server (11); and in said authentication stage (22):

e) comparing, at said Behaviometric-server (13), said received identifier and said received behavioral data to profile data related to said received identifier collected during prior usage of said service of 'Relying Party' (12) by said user (6);

f) determining, at said Behaviometric-server (13), whether said behavioral data collected during said preparation stage matches said profile data, whereby the result of said determining is an authentication or a rejection of privileged access sought by said user (6);

g) when said result is said authentication, executing said transaction requested by said user (6);

g) when said result is said rejection:

1) sending to said user device (7) and presenting to said user (6) an input form including at least one part of stored data entered by said user at at least one previous session resulting in authentication;

in a secondary preparation stage:

2) asking said user (6) to reenter said at least one part of stored data;

3) collecting and storing behavioral data from at least one user input component of said device (7) on said non-transitory storage medium housed within said device (7), said collecting being carried out by a background process; and 4) transmitting said identifier and at least a portion of said stored behavioral data from said client to said Behaviometric-server (13) via said web-server (11) and said connection; and in a secondary authentication stage (26):

5) said Behaviometric-server (13) matches said identifier and said behavioral data received during said secondary preparation stage to said profile data related to said received identifier collected during prior usage of said service of 'Relying Party' (12) by said user (6);

6) determining, by said Behaviometric-server (13), whether said received behavioral data entered during said secondary preparation stage matches collected behavioral data whereby the result of said determining is an authentication or a rejection of privileged access sought by said user (6);

7) if said result is said authentication, executing said transaction requested by said user (6) of said service.

15. The method of claim 14, further including in said primary preparation stage (21):

capturing device information relating to said user device (7);

transmitting said captured device information to said Behaviometric-server (13);

storing said captured device information, associated with said behavioral data in a memory associated with said Behaviometric-server (13); and the method further including, following rejection at said primary authentication stage (22), selecting a part of stored data dependent on said device information.

16. The method of claim 14, wherein, following a said rejection in said secondary authentication stage, said transaction requested by said user (6) of said service is prohibited.

* * * * *